United States Patent Office 3,803,311
Patented Apr. 9, 1974

3,803,311
BABY FOOD PREPARATION
Betty Yu-Lin Ho, 807 Riverside Drive,
New York, N.Y. 10032
No Drawing. Continuation-in-part of abandoned application Ser. No. 757,310, Sept. 4, 1968. This application Oct. 16, 1970, Ser. No. 81,494
Int. Cl. A23c 11/00
U.S. Cl. 426—185
10 Claims

ABSTRACT OF THE DISCLOSURE

A baby food is prepared that is particularly suitable for infants in reducing digestion problems while simultaneously meeting major nutritional requirements. The food contains about 2 tablespoons of cornstarch per quart of water, about 4 oz. of milk per 4 oz. of a homogeneous colloidal suspension of cornstarch and about 4 tablespoons of sugar per quart of the water. The method for making the food involves preparing the cornstarch into a homogeneous colloidal suspension and thereafter admixing the milk.

---

This is a continuation in part of U.S. Ser. No. 757,310, filed Sept. 4, 1968 and now abandoned.

This invention is directed to a nutritional food preparation particularly beneficial in reducing digestive problems or the possibility thereof and the improvement or advancement of restful sleep essential to healthy growth and development of infants, and the process of making the food preparation.

Prior to this invention, there have existed various food preparations for infants, a large number of which are not tailored to the needs of infants in need of fulfillament if the infants are to have a healthy growth and development. A major problem with infant preparations in general is that either the preparation proves to be too strenuous on the infant's digestive system, resulting in digestion, colic, or the like, or the inability for the baby to retain the food. Some preparations perhaps otherwise suitable are not palatable, the baby refusing the preparation. A less obvious problem, but even more important possible because it not recognizable by the average mother unless it becomes a pronounced problem, is the problem of the infant or baby only fitfully sleeping, not fully resting or relaxing, possibly often sleeping for short periods of time, and possibly accompanied by more than normal crying, the problem often arising from food preparation(s) fed to and accepted by the baby which neverthless require extensive digestion over extended periods thereby prolonging the activity of the digestive organs, additionally fatiguing the baby, interfering with sleep, and because of fatigue and/or lack of restful sleep, the aggregating of other problems related to fatigue, tension, and lack of sleep. Also, if the food preparation fed a baby is not tasteful to the baby, the baby often may not take (accept) a sufficient amount of the food to meet this body requirements essential for healthful growth and activity of a baby of his particular age.

It has been found that the human brain grows up to seventy five (75%) percent of its total size by the age of one (1) years, while the body assumes a condition from motionless to independent motion. By means of this food composition, homeostasis while being poorly regulated at birth become almost completely fixed by the age of one (1) year and will assume perfect regulation when the digestive organs begin normal digestive functions.

An object of this invention is a food preparation for infants and/or young children avoiding and/or overcoming the above noted problems.

It is another object of this invention to provided a more perfect formation of the sympathetic ganglia which we are trying to achieve by a most digestible infant formula from the moment of birth on to the end of the first year of life.

It is a further object of this invention to provide a food composition where no artificial or other vitamins of any sort are necessary as a supplement, except those received from fresh fruit juices.

A still further object of this invention is a process of making such a food preparation. Other objects become apparent from the preceeding and following disclosure.

The above objects are obtained by a novel food composition and novel process of making the food composition, the food composition comprising water, colloidal cornstarch, and milk, in admixture, said colloidal cornstarch being in about homogeneous suspension in said water, said milk ranging from about 1 part of milk per 3 parts of said water for an infant preparation to about 2 parts of milk per 1 part of said water for a preparation for a baby of at least about 3 months of age, the cornstarch ranging from about 1 to about 3 level tablespoons thereof per quart of said water, and said composition being characterized by properties dependent upon said homogeneous suspension preceding admixture of said milk. Accordingly, the novel process requires that the water and cornstarch be admixed sufficiently to form a substantially homogeneous colloidal suspension prior to the addition of and admixing therewith the milk.

The above described composition preferably includes from about 1 to about 8 parts of a sugar per quart of said water, the sugar being preferably present in the range of from about 2 to about 5 tablespoons per quart of water. The composition, as to other ingredients and as to the process, preferably includes the milk in a range from about 3 parts of milk per 5 parts of the water to about 1 part of the milk per 1 part of the water, and the cornstarch preferably ranges from about 1.7 to about 2.3 level tablespoons per quart of said water. The point of addition of the sugar is not critical, although both the milk and sugar normally are added immediately prior to the time of use, but may be included in the composition as a whole initially—subject to the order of steps of the process as noted above. For infants, a preferred preparation employs solely skim milk as the milk component of the food comopsition, the skim milk being easily digestable. For ages of babies of about 3 months up to about a year or more, whole milk is preferred.

In carrying out the above novel process to produce the novel composition, a typical process is as follows. Two level tablespoons of cornstarch are mixed with a quart of water, and the mixture is first boiled (i.e., heated to about 212° F. for a period sufficient to homogenize the starch) and then allowed to simmer until the cornstarch has become about homogeneously suspended in colloidal suspension (i.e., a homogenized colloidal suspension) in the nature of a soup. This soup is either stored, such as in a refrigerator, or employed in the continuing procedure of thereafter mixing with milk—either already prepared whole or skim milk, or alternatively an equivalent amount of milk prepared from powdered milk. The proportion of milk for a baby bottle—for example of about eight ounces, is to be decided or determined by the physician according to the infant's age, weight, maturity (for example whether or not premature) and the like, and the soup is added to the bottle to finish filling the bottle, such as for the remaining five ounces of an eight ounce bottle. Accordingly, the final food composition includes the wholesome cornstarch food in a palatable form as well as containing the milk component in a very dilute form easily digestible. Also, to the bottle is added about two level teaspoons of sugar, this amount of sugar thereby falling within the above stated range relative to the initial water employed to produce the soup. Preferably the sugar is added before addition of the soup to the bottle, thereby facilitating the admixing of the sugar by the soup addition.

By employment of the above described food product, the digestion of the infant or baby may be facilitated while simultaneously providing healthful nutrition, the facilitated digestion resulting from the accelerated digestion thereby made possible, and the nutrition resulting both from the fact that the nature and quantity of ingredients are nutritious and that the composition prepared by the novel process render a cornstarch soup which is pleasant to the feel and taste of the infant's tongue and from the fact that because of the pleasant taste the baby accepts a needed quantity thereof without digestive problems during or after the feeding, thereby making possible more immediate and restful sleep. It has been found that even at rest, a nerve consumes oxygen and also produces carbon dioxide, this being increased when a nerve is stimulated. Only when nerve impulses are reduced to a minimum can sleep be induced. The most common cause of insomnia is muscular tension—which muscular tension is synonymous with muscular contraction; in physiological terms we say that it is a certain dilation of muscle capillaries, skeletal or smooth. During sleep, blood is diverted from organs involved in the sleep process whenever and to the extent that there is activity of the digestive system for digestive purposes. The two largest capillary beds of the body are those of the smooth musculature of the digestive system and of the skeletal musculature, it therefor being important to obtain relaxation in these two musculatures, such that sufficient blood may return to the systemic circulation and fill the remainder of the capillary system to the utmost. Thus, relative to a baby food preparation, the utmost of concern should be directed to the relaxation of the smooth muscles, i.e., with the parasympathetic nervous system. It should be noted that only in the presence does anabolism (i.e., bodybuilding) occur, the sleeping period being a major period for body anabolism, it then being necessary to have a normal volume of circulating red cell volume, sufficient to fill capillaries of tissues involved during sleep. When the circulating red cell volume is small, many capillaries will remain closed, anabolism will occur to a lesser degree; the smallest diversion of blood to splanchnic vessels will affect sleep and cause it to be lighter and of a shorter duration.

The nervous system may be divided into the exterofective system composed of exteroceptors and muscles—this system also called the voluntary system, and the interofective system composed of heart, smooth muscles and glands—also called the involuntary system, the latter system being divided into the parasympathetic system (cranio-sacral outflow) and the sympathetic system (thoracico-lumbar outflow). The parasympathetic system dilates mostly vessels such as cerebral, abdominal and pelvic viscera, and external genitalia, and glands such as salivary, gastric and pancreas, and smooth muscles such as small intestine, large intestine, and bladder, whereas the sympathetic system dilates mostly vessels such as heart muscles and lungs, bronchi, iris, smooth muscle of skin, and glands such as sweat, liver and adrenal medulla. Sleep involves mainly the sympathetic division of the autonomic system, while the parasympathetic nervous system dilates mostly the organs involved in the digestive process. It is note-worthy to consider the capillary functions of each of the three nervous systems, i.e., the exterofective system, the parasympathetic division of the autonomic system, and the sympathetic division of the autonomic system. Taking the three sets of capillaries independently of the circulatory system, during particular function the volume of blood in a closed circulatory system remains the same—although the rate of flow may vary, and the sum of the capillaries open in one or more system must balance the number of closed—or substantially closed—capillaries in another system. During light exterofective function or light physical work a few capillaries open in the exterofective system while most capillaries are open and a few thereof close in the parasympathetic system and similarly also in the sympathetic system; during heavy exterofective function, or heavy physical work, most capillaries open in the exterofective system while many capillaries are closed in the parasympathetic division and similarly also in the sympathetic system; but if one tries to sleep after a heavy meal—or a baby tries to sleep following consumption of food requiring extensive digestion and/or digestion over an extended period of time, gradually there develops a state of a few capillaries open in the parasympathetic system while a few capillaries close in the sympathetic system and similarly also a few capillaries close in the exterofective system, which state moves to another situation in which many capillaries are closed in the sympathetic system and similarly also in the exterofective system while most capillaries open in the parasympathetic division, this latter situation being characteristic of the systems during a heavy meal; in such a state, the baby will probably awaken, i.e., the sleep will be light and disturbed and of short duration. Thus, except in the case of deep sleep, the homostatic mechanisms receive a lessened blood supply. Accordingly, the significance of a baby food composition easily and quickly digestible is more fully appreciable, and the importance of the present invention is more clearly emphasized.

Although any sugar may be employed as the sugar in the composition of this invention, in the spirit of the invention the more easily digested sugars such as dextrose and/or maltose as opposed to sucrose, for example. Similarly, honey may be employed as the sugar component, the honey having the additional advantage of being a natural easily digestible food.

As discussed above, in other regard it is likewise within the scope of this invention to make such modifications and/or employment of equivalents as would be apparent to a person of skill in the particular food art. For example, although in the illustrative example the starch-containing water is boiled, other homogenizing methods may be employed to produce the colloidal suspension such as employing conventional whole milk homogenizing equipment.

What is claimed is:

1. A composition consisting essentially, of water, colloidal cornstarch, and milk, in admixture, said colloidal cornstarch being in about homogeneous suspension in said water, said milk ranging from about 1 part of milk per 3 parts of said water for an infant preparation to about 2 parts of milk per 1 part of said water for a preparation for a baby of at least about 3 months of age, said cornstarch ranging from about 1 to about 3 level tablespoons thereof per quart of said water, and said composition being characterized by properties dependent upon said homogeneous suspension preceding admixture of said milk.

2. A composition according to claim 1, including from about 1 to about 8 tablespoons of a sugar per quart of said water.

3. A composition according to claim 2, in which said milk ranges from about 3 parts of milk per 5 parts of said water to about 1 part of said milk per 1 part of said water, said cornstarch ranges from about 1.7 to about 2.3 level tablespoons per quart of said water, and said sugar ranges from about 2 to about 5 level tablespoons per quart of said water.

4. A composition according to claim 3, in which said milk consists of skim milk.

5. A composition according to claim 1 in which said milk consists of skim milk.

6. A process consisting essentially of admixing cornstarch with water sufficiently to form a substantially homogeneous colloidal suspension of said cornstarch in said water, and thereafter admixing milk with said homogeneous colloidal suspension, said milk ranging from about 1 part of milk per 3 parts of said water for an infant preparation to about 2 parts of milk per 1 part of said water for a preparation for a baby of at least about 3 months of age, and said cornstarch ranging from about 1 to about 3 level tablespoons thereof per quart of said water.

7. A process according to claim 6, including admixing a sugar with at least one of other ingredients, said sugar being admixed in an amount ranging from about 1 to about 8 level tablespoons full of a sugar per quart of said water.

8. A process according to claim 7, in which said milk ranges from about 3 parts of milk per 5 parts of said water to about 1 part of milk per 1 part of said water, said cornstarch ranges from about 1.7 to about 2.3 level tablespoons per quart of said water, and said sugar ranges from about 2 to about 5 level tablespoons per quart of said water.

9. A process according to claim 8, in which said milk consists of skim milk.

10. A process according to claim 6, in which said milk consists of skim milk.

References Cited

UNITED STATES PATENTS

| | | | |
|---|---|---|---|
| 2,559,022 | 7/1951 | Lolkema | 99—83 |
| 2,396,592 | 3/1946 | Moller | 99—83 |
| 1,259,483 | 3/1918 | Brown | 99—63 |

DAVID M. NAFF, Primary Examiner

U.S. Cl. X.R.

426—190, 359